(12) United States Patent
Seldess et al.

(10) Patent No.: US 11,863,950 B2
(45) Date of Patent: *Jan. 2, 2024

(54) DYNAMIC RENDERING DEVICE METADATA-INFORMED AUDIO ENHANCEMENT SYSTEM

(71) Applicant: Boomcloud 360 Inc., Encinitas, CA (US)

(72) Inventors: Zachary Seldess, San Diego, CA (US); Joseph Anthony Mariglio, III, Encinitas, CA (US); Paul Riker, San Diego, CA (US); Daniel Elworthy Ross, San Diego, CA (US); Raphael Alberto Melgar, San Marcos, CA (US); Chuan Hsueh, Irvine, CA (US)

(73) Assignee: Boomcloud 360 Inc., Encinitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/983,897

(22) Filed: Nov. 9, 2022

(65) Prior Publication Data

US 2023/0067260 A1 Mar. 2, 2023

Related U.S. Application Data

(63) Continuation of application No. 16/902,044, filed on Jun. 15, 2020, now Pat. No. 11,533,560.

(Continued)

(51) Int. Cl.
*H04R 3/04* (2006.01)
*H04R 3/12* (2006.01)
(Continued)

(52) U.S. Cl.
CPC ............. *H04R 3/04* (2013.01); *G06F 16/903* (2019.01); *H04R 3/12* (2013.01); *H04R 5/033* (2013.01); *H04R 5/04* (2013.01)

(58) Field of Classification Search
CPC . H04R 3/04; H04R 3/12; H04R 5/033; H04R 5/04; G06F 16/903
(Continued)

(56) References Cited

U.S. PATENT DOCUMENTS 8,867,750 B2 10/2014 Brown
9,191,742 B1 * 11/2015 Worley, III ........... H04W 4/025
(Continued)

FOREIGN PATENT DOCUMENTS

CN 106060757 A 10/2016
CN 109218528 A 1/2019
(Continued)

OTHER PUBLICATIONS

Extron, "Understanding EDID—Extended Display Identification Data," Date Unknown, 7 pages, [Online] [Retrieved on Jun. 30, 2020] Retrieved from the Internet <URL: https://www.extron.com/article/uedid>.

(Continued)

*Primary Examiner* — Norman Yu
(74) *Attorney, Agent, or Firm* — Fenwick & West LLP

(57) ABSTRACT

A device renders enhanced audio based on properties of an audio rendering system. For example, audio rendering system information of an audio rendering system associated with the device is used to determine an audio enhancement optimized for the audio rendering system. The OS of the device (e.g., a mobile phone) is queried to determine the audio rendering system information. The audio rendering system information is used to determine an audio enhancement, such as by querying a database storing associations between rendering system information and audio enhancements. The audio enhancement may include, for example, one or more types of audio processing (e.g., subband spatial processing, crosstalk processing, etc.) and particular param- (Continued)

eters for the audio processing. The audio enhancement is applied to an audio signal to generate an enhanced audio signal that is provided to the audio rendering system.

36 Claims, 7 Drawing Sheets

Related U.S. Application Data

(60) Provisional application No. 62/936,327, filed on Nov. 15, 2019.

(51) Int. Cl.
*G06F 16/903* (2019.01)
*H04R 5/033* (2006.01)
*H04R 5/04* (2006.01)

(58) Field of Classification Search
USPC ..... 381/58, 59, 119, 74, 107, 120, 315, 103, 381/98, 104, 1, 300, 309
See application file for complete search history.

(56) References Cited

U.S. PATENT DOCUMENTS

| | | |
|---|---|---|
| 9,269,360 B2 | 2/2016 | McGrath |
| 9,967,689 B1 | 5/2018 | Kadri |
| 2012/0170756 A1 | 7/2012 | Kraemer et al. |
| 2014/0044276 A1 | 2/2014 | Hulvey |
| 2014/0328485 A1 | 11/2014 | Saulters |
| 2015/0124944 A1* | 5/2015 | Perotti .................. G06Q 30/01 379/88.01 |
| 2015/0294675 A1 | 10/2015 | Hammarqvist |
| 2016/0212532 A1 | 7/2016 | Grokop |
| 2016/0269128 A1 | 9/2016 | Gautama et al. |
| 2017/0099557 A1 | 4/2017 | Saunders |
| 2017/0208411 A1 | 7/2017 | Seldess et al. |
| 2018/0098151 A1 | 4/2018 | Penke et al. |
| 2019/0158974 A1 | 5/2019 | Tsingos et al. |
| 2019/0306652 A1 | 10/2019 | Robinson et al. |
| 2019/0327559 A1 | 10/2019 | Smith |
| 2020/0045490 A1 | 2/2020 | Liu et al. |

FOREIGN PATENT DOCUMENTS

| | | |
|---|---|---|
| EP | 3340660 A1 | 6/2018 |
| JP | 2004236192 A | 8/2004 |
| JP | 2004252279 A | 9/2004 |
| JP | 2005217559 A | 8/2005 |
| JP | 2016502345 A | 1/2016 |
| JP | 2019508978 A | 3/2019 |
| KR | 10-2015-0117699 A | 10/2015 |
| KR | 10-2018-0132032 A | 12/2018 |
| TW | M487509 U | 10/2014 |
| TW | I651005 B | 2/2019 |

OTHER PUBLICATIONS

Google Developers, "AudioDeviceInfo," Date Unknown, 21 pages, [Online] [Retrieved on Jun. 30, 2020] Retrieved from the Internet <URL: https://developer.android.com/reference/android/media/AudioDeviceInfo>.

Google Developers, "BluetoothClass.Device," Date Unknown, 20 pages, [Online] [Retrieved on Jun. 30, 2020] Retrieved from the Internet <URL: https://developer.android.com/reference/android/bluetooth/BluetoothClass.Device.html>.

Lynxbee, "Using hcitool to get bluetooth device information," Date Unknown, seven pages [Online] [Retrieved on Jun. 30, 2020] Retrieved from the Internet <URL: https://www.lynxbee.com/using-hcitool-toaet-bluetooth-device-information/>.

PCT International Search Report and Written Opinion, PCT Application No. PCT/US2020/053660, dated Jan. 20, 2021, nine pages.

Taiwan Intellectual Property Administration, Office Action, TW Patent Application No. 109136103, dated Oct. 28, 2021, 19 pages.

United States Office Action, U.S. Appl. No. 16/902,044, filed Mar. 10, 2021, 13 pages.

United States Office Action, U.S. Appl. No. 16/902,044, filed Sep. 8, 2021, 17 pages.

United States Office Action, U.S. Appl. No. 16/902,044, filed Dec. 21, 2021, 16 pages.

United States Office Action, U.S. Appl. No. 16/902,044, filed Apr. 22, 2022, 19 pages.

Korean Intellectual Property Office, Korean Office Action, Korean Patent Application No. 2022-7020078, dated May 31, 2023, 5 pages.

Japan Patent Office, Office Action, Japanese Patent Application No. 2022-527900, dated Jul. 18, 2023, 10 pages.

Hooks, S. "Powerful Dolby Atmos Sound Coming to Xbox One and Windows 10," Xbox.com, Dec. 14, 2016, 6 pages, Retrieved from the internet <URL:https://news.xbox.com/en-us/2016/12/14/dolby-atmos-xbox-one-windows-10/>.

Dolby, "Dolby Virtual Speaker," Dolby Technologies, Jan. 29, 2009, 1 page, Retrieved from the internet <URL:https://web.archive.org/web/20090129084314/http:/www.dolby.com/consumer/technology/virtual_speaker.html>.

Dolby, "Dolby Virtual Speaker Technology: Fundamental Principles," Dolby Technologies, Feb. 4, 2009, 5 pages, Retrieved from the internet <URL:https://web.archive.org/web/20090204003955/http:/www.dolby.com/consumer/technology/virtual_speaker_wp.html>.

Dolby, "Dolby PC Entertainment Experience," Dolby Personal Computer, Feb. 10, 2009, 1 page, Retrieved from the internet <URL:https://web.archive.org/web/20090210195032/http:/www.dolby.com/consumer/pc/pcee/index.html>.

Deboer, C. "Dolby Updates PC Entertainment Experience Program," Audioholics.com, Mar. 12, 2008, 2 pages, Retrieved from the internet <URL:https://www.audioholics.com/news/dolby-pc-entertainment-experience>.

Extended European Search Report and Written Opinion, European Patent Application No. 20888367.8, dated Nov. 6, 2023, 7 pages.

\* cited by examiner

300

```
┌─────────────────────────────────────────────────┐
│ Determine rendering system information of our   │
│ audio rendering system of a device              │
│                    305                          │
└─────────────────────────────────────────────────┘
                        │
                        ▼
┌─────────────────────────────────────────────────┐
│ Determine an audio enhancement for an audio     │
│ signal based on rendering system information    │
│                    310                          │
└─────────────────────────────────────────────────┘
                        │
                        ▼
┌─────────────────────────────────────────────────┐
│ Apply audio enhancement to audio signal to      │
│ generate an enhanced audio signal               │
│                    315                          │
└─────────────────────────────────────────────────┘
                        │
                        ▼
┌─────────────────────────────────────────────────┐
│ Provide the enhanced audio signal to the audio  │
│ rendering system                                │
│                    320                          │
└─────────────────────────────────────────────────┘
```

FIG. 3

DYNAMIC RENDERING DEVICE METADATA-INFORMED AUDIO ENHANCEMENT SYSTEM

CROSS REFERENCE TO RELATED APPLICATIONS

This application is a continuation of co-pending U.S. application Ser. No. 16/902,044, filed Jun. 15, 2020, which claims the benefit of U.S. Provisional Application No. 62/936,327, filed Nov. 15, 2019, both of which are incorporated by reference in their entireties.

TECHNICAL FIELD

The disclosure generally relates to audio enhancement, and more specifically to device metadata-informed audio enhancement.

BACKGROUND

Audio rendering systems (e.g., speakers or headphones) may include different characteristics with varying capabilities and limitations. For example, different mobile devices (e.g., a smartphones) may include different numbers of speakers. The speakers may include different frequency responses depending on the quality or size of the speakers. The speakers may be in different locations on the device or may be oriented in different directions. In another example, speakers may have capabilities limited by the system-on-chip (SoC) it was manufactured with. Users may experience audio content differently, including in unintended or undesirable ways, depending on the properties of the audio rendering system. As such, it is desirable to be able to adjust audio content to compensate for differences in audio rendering systems.

SUMMARY

Embodiments relate to audio enhancement using device metadata. An audio enhancement system described herein may render enhanced audio signals by applying audio enhancements, where the audio enhancements are specific to a device or audio rendering system configured to output the audio signals. The audio enhancement system, by querying the operating system (OS) of the device to determine device-specific enhancements, is capable of providing device-specific rendering of the enhanced audio signals. In some embodiments, the audio enhancement system is located on the device. In other embodiments, the audio enhancement system is located at a server connected to the device (e.g., client device) via a network.

In some embodiments, the audio enhancement system determines rendering system information of an audio rendering system associated with a device by querying the OS of the device. For example, the audio enhancement system queries the OS of a mobile device (e.g., mobile phone) to determine the manufacturer and the present orientation of the mobile device. The audio enhancement system may determine an audio enhancement for an audio signal (e.g., the signal output by the audio rendering system associated with the device prior to enhancement) based on the rendering system information. For example, the audio enhancement system determines an audio enhancement involving subband processing of the audio signal, the particular properties of the subband processing being mapped to the particular manufacturer and present orientation of the mobile device. The audio enhancement system may apply the audio enhancement to the audio signal to generate an enhanced audio signal. For example, the audio enhancement system applies subband processing to the audio signal that the mobile device was configured to output prior to enhancement. The audio enhancement system may provide the enhanced audio signal to the audio rendering system. For example, if the audio enhancement system is located on the mobile device, then the enhanced signal may be transmitted to the audio rendering system through a bus or other communication channel of the mobile device. In another example, the audio enhancement system, if located on a server remote to the mobile device, transmits the enhanced signal through a wireless network (e.g., a cellular communication network, the Internet, etc.) to the mobile device to be played back through the audio rendering system associated with the mobile device (e.g., speakers integrated with the mobile device, or one or more peripheral wireless or wired speakers communicatively coupled to the mobile device).

Some embodiments include a device. The device includes an audio rendering system and circuitry configured to enhance an audio signal. In particular, the circuitry is configured to determine rendering system information of an audio rendering system associated with the device, determine an audio enhancement for the audio signal based on the rendering system information, apply the audio enhancement to the audio signal to generate an enhanced audio signal, and provide the enhanced audio signal to the audio rendering system.

Some embodiments include a non-transitory computer readable medium storing instructions that when executed by one or more processors configure the one or more processors to determine rendering system information of an audio rendering system associated with a device by querying an operating system of the device, determine an audio enhancement for the audio signal based on the rendering system information, apply the audio enhancement to the audio signal to generate an enhanced audio signal, and provide the enhanced audio signal to the audio rendering system.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 is a network diagram illustrating a communication environment in which an audio enhancement system operates, in accordance with at least one embodiment.

FIG. 3 is a flowchart of a process for providing an enhanced audio signal, in accordance with at least one embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Audio Enhancement System Architecture

Figure 1:
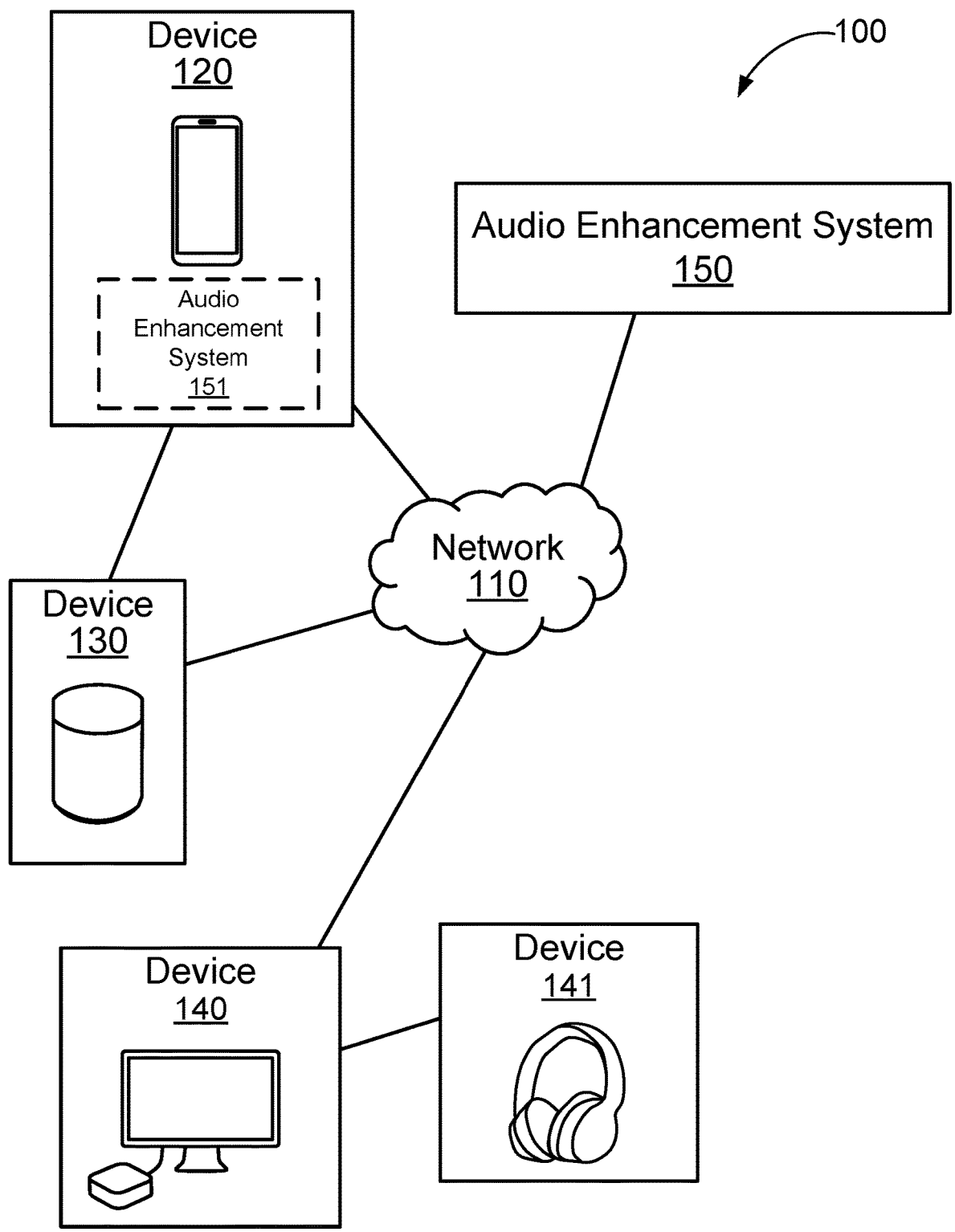
Figure 2:
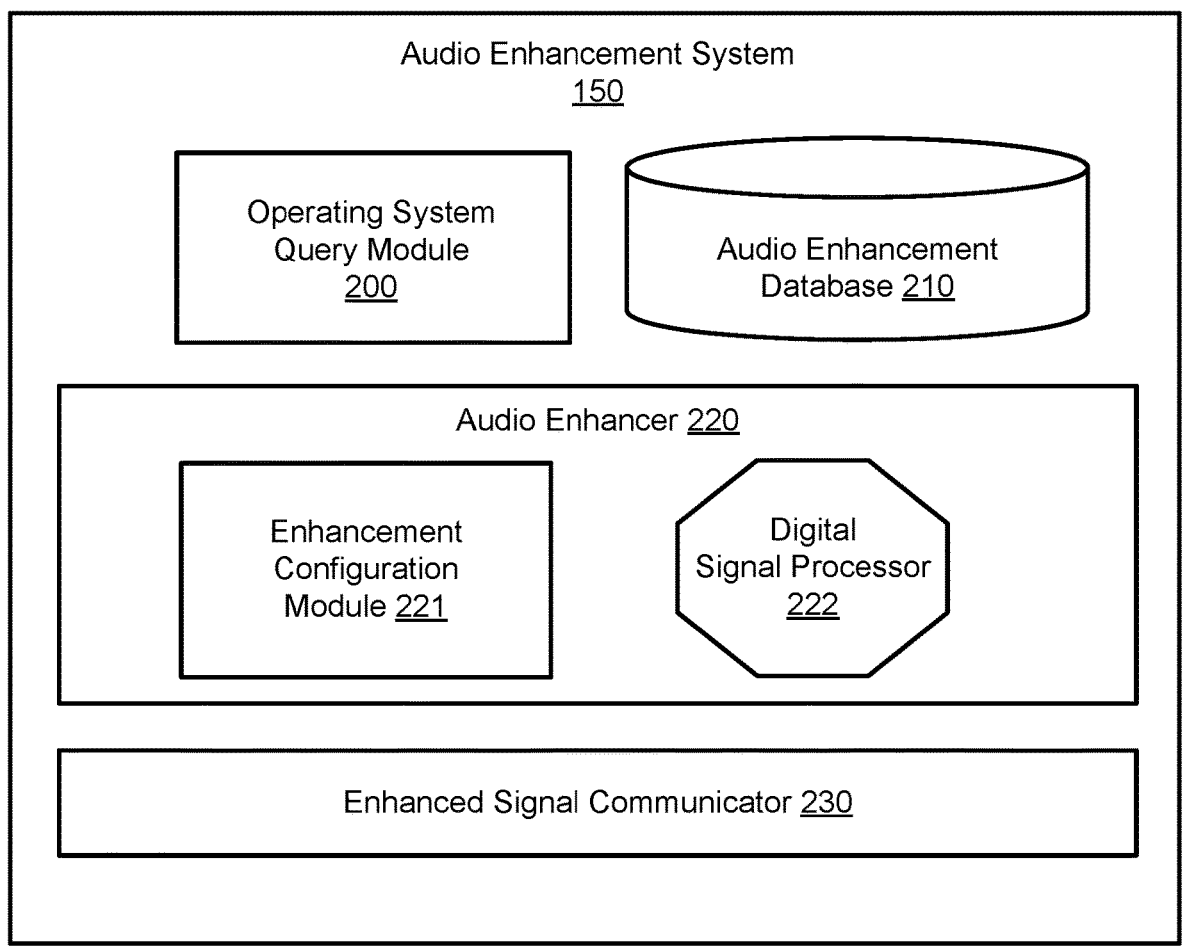
FIG. 2 is a block diagram of the audio enhancement system of FIG. 1, in accordance with at least one embodiment.

FIG. 1 is a network diagram illustrating a communication environment 100 in which an audio enhancement system 150 operates. Communication environment 100 includes a network 110, devices 120, 130, 140, and 141, and the audio enhancement system 150. In alternative configurations, different and/or additional components may be included in communication environment 100. For example, a remote database, although not depicted, may be accessed by the audio enhancement system 150 through the network 110 to retrieve audio rendering data regarding any of the devices 120, 130, or 140. In some embodiments, databases for retrieving audio rendering data may be part of the audio enhancement system 150 (e.g., as shown in FIG. 2).

Network 110 is communicatively coupled with at least one device (e.g., the device 120, the device 130, and the device 140) and the audio enhancement system 150. The network 110 may be one or more networks including the Internet, a cable network, a mobile phone network, a fiberoptic network, or any suitable type of communications network.

Although depicted in FIG. 1 as being separate from the devices 120, 130, and 140 (e.g., located on a remote server that is coupled to devices), the audio enhancement system 150 may be incorporated into a device 120, 130, or 140, or any suitable device capable of rendering audio. For example, the device 120 may execute an application with a local audio enhancement system 151 that processes and enhances audio as performed by the audio enhancement system 150 described herein. Some or all of the components of the audio enhancement system 150 such as software modules (e.g., an operating system query module 200) and databases (e.g., a database 210) may be incorporated into the device.

Devices 120, 130, and 140 are a mobile phone, wireless speaker, and smart television, respectively. Devices may include mobile phones, wireless speakers such as Bluetooth speakers (Bluetooth is a trademark of the Bluetooth Special Interest Group), smart watches, wearable devices, virtual reality or augmented reality devices, smart glasses, wired or wireless headphones, wired or wireless speakers, smart televisions (TV), laptop computers, tablet computers, personal computers, video game consoles, or any suitable electronic device including an audio rendering system for rendering audio content.

Each of the devices 120, 130, and 140 may be associated with an audio rendering system. The audio rendering system may be either located in the device or peripherally connected to the device. For example, a mobile phone has a built-in audio rendering system including speakers. In some embodiments, the audio rendering system may be a peripheral device to another device. For example, a tablet computer may communicate with an audio rendering system including a Bluetooth speaker, such as by using the Bluetooth Advanced Audio Distribution Profile (A2DP) standard to transfer audio signals to the Bluetooth speaker. A device may be coupled to a separate audio rendering system without external network routing equipment to facilitate their connection. For example, the device 120, a mobile phone, may use its built-in Bluetooth communication system to communicate with the device 130, a wireless speaker, without network routing equipment included in the network 110 such as a Wi-Fi router (Wi-Fi is a trademark of the Wi-Fi Alliance). In this example, the device 130 is used as the audio rendering system associated with the device 120, and the native audio rendering system of the device 120 is inactive. In another example, the device 140, a smart TV platform, may support a connection to a device 141 (e.g., support wired or wireless headphones through an analog audio jack, wired USB connection, or Bluetooth). In this example, the device 141 is used as the audio rendering system associated with the device 140, and the native audio rendering system of the device 140 is inactive.

In some embodiments, the audio rendering system associated with a device is characterized by rendering system information. Rendering system information may include various types of data that indicate acoustic properties of the audio rendering system, such as a unique device identifier of the device containing the audio rendering system, a model identifier or product identifier of the device containing the audio rendering system, a position or orientation of the device or audio rendering system relative to a user, a device class of the device containing the audio rendering system, a communication path of an audio signal transmitted to the audio rendering system, an audio codec used by the device, or any suitable combination thereof.

A unique device identifier is an identifier that identifies a particular device. A unique device identifier may include a device serial number, an International Mobile Equipment Identity (IMEI) number, or a Bluetooth address (e.g., for Bluetooth speaker devices). A model identifier or product identifier defines a particular product. A model identifier or product identifier may be a Stock Keeping Unit (SKU) number, manufacturer ID (MID), or product or model name. Position or orientation of the device or audio rendering system relative to the user defines how a user has positioned the device (e.g., with integrated speakers) or audio rendering system. For example, a device (e.g., smartphone or tablet) may operate in portrait or landscape mode, depending on how the user is holding the device, and may change which speaker operates as a left speaker and which speaker operates as a right speaker. In another example, the orientation of a mobile phone during a call may indicate which speaker(s) is being used to render audio content. Device class of the audio rendering system defines a category of the device such as mobile phone, tablet, personal computer, automotive, speaker, headphones, wearable, audiovisual (A/V) receiver, TV, sound bar, or any other suitable category for devices capable of outputting audio. A communication path of an audio signal defines how audio content is transmitted to the audio rendering system. A communication path may include speakers integrated with the device or speakers of a peripheral device. A communication path may include a route through built-in speakers on a mobile phone or tablet, wireless communication (e.g., wireless streaming) over Bluetooth A2DP, wireless communication over Wi-Fi such as a Wi-Fi-enabled display between mirrored screens, communication over an analog cable connection such as wired headphones connected to a mobile phone, communication over high-definition multimedia interface (HDMI) (HDMI is a trademark of HDMI Licensing Administrator, Inc.), or communication over other cable connection types connected to a mobile phone. An audio codec defines a program used by the device that encodes or decodes audio content, and this information may indicate the manufacturer or other information about the device.

The audio enhancement system 150 may receive rendering system information about the audio rendering system from devices 120, 130, and 140. In some embodiments, the audio enhancement system 150 determines an audio enhancement for an audio signal using the received rendering system information, applies the audio enhancement to the audio signal to generate an enhanced audio signal, and provides the enhanced audio signal to an audio rendering system associated with the device 120, 130, or 140. The audio enhancement system 150 may include processing circuitry configured to execute software modules that perform various operations discussed herein. In some embodiments, the audio enhancement system 150 maintains at least one database for determining the audio enhancement that is specific to an audio rendering system (e.g., a database mapping rendering system information to defined audio enhancements). In some embodiments, databases for determining audio enhancements may be an online database that is accessible over a network (e.g., the network 110) and is not locally stored by the audio enhancement system 150. The audio enhancement system 150 is further described in the description of FIG. 2.

Audio Enhancement System

FIG. 2 is a block diagram of the audio enhancement system 150 of FIG. 1. The audio enhancement system 150 includes multiple software modules: an operating system query module 200, an audio enhancer 220, and an enhanced signal communicator 230. The audio enhancement system 150 further includes an audio enhancement database 210 that stores associations between rendering system information to audio enhancement configurations.

The operating system query module 200 is configured to determine rendering system information of an audio rendering system associated with a device by querying an OS of the device. The operating system of the device operates the device and the audio rendering system associated with the device, and thus the operating system may be aware of one or more types of rendering system information discussed herein. The operating system query module 200 queries the OS of the device, which in turn retrieves rendering system information and provides the rendering system information to the operating system query module 200. The operating system query module 200 may output rendering system information to the audio enhancer 220. In some embodiments, the operating system query module 200 may include software submodules for querying different types of rendering system information. In one example, the operating system query module 200 queries an OS of a smart TV platform for extended display identification data (EDID) for a TV monitor to which the smart TV platform is communicatively coupled via HDMI. As referred to herein, a "smart TV platform" refers to a microconsole configured to facilitate the storage, playback or viewing of media (e.g., set-top box, digital media player, or streaming box) when communicatively coupled to a component of a standard TV set. In another example, the operating system query module 200 queries an OS of a mobile phone using Android OS's BluetoothClassDevice class (Android is a trademark of Google LLC) application programming interface (API) for the device class information of a Bluetooth speaker communicatively coupled to the mobile phone.

For example, the operating system query module 200 queries an OS of a device to determine a unique device identifier of the device or any suitable unique identifier of the audio rendering system. For example, the operating system query module 200 queries the OS of a mobile phone to determine the unique 15-digit IMEI number of the mobile phone. In another example, the operating system query module 200 queries an OS of a mobile phone that is communicatively coupled with a Bluetooth speaker to determine the Bluetooth speaker address of the speaker. In another example, the operating system query module 200 queries the OS of a mobile phone that is communicatively coupled with a vehicle's audio rendering system to determine a unique device identifier for the vehicle's speakers.

The operating system query module 200 queries an OS of a device to determine a communication path of an audio signal in the device. For example, the operating system query module 200 queries the OS of a mobile phone to determine that audio is being routed out through the built-in speakers on the mobile phone as opposed to routed out through headphones connected via a headphone jack, which is an alternative communication path. In another example, the operating system query module 200 queries the OS of a mobile phone that is communicatively coupled with a pair of Bluetooth speakers to determine that the audio is communicated over Bluetooth A2DP to the Bluetooth speakers. As an additional example, the operating system query module 200 queries the OS of a mobile phone that is communicatively coupled with a vehicle's audio system to determine that audio is communicated over a connection between the mobile phone and the vehicle's audio system (e.g., a universal serial bus (USB) wired connection or Bluetooth wireless connection).

The operating system query module 200 queries an OS of a device to determine use-case information of the device. As referred to herein, "use-case information" is metadata about the active communication path, the metadata indicative of an application associated with the audio signal. For example, use-case information can indicate that the audio signal on a particular communication path is for a phone call, music playback, video playback, gaming, or any other suitable application that is executed by a device concurrent with the output of audio from the device. Additionally, use-case information can indicate the audio capabilities of the application that the audio signal is used for (e.g., 2ch or 5.1 surround sound)

The operating system query module 200 queries an OS of a device to determine a model identifier or product identifier, such as the SKU of a device. For example, the operating system query module 200 queries the OS of a mobile phone to determine that the SKU number of the phone is 6323532. In some embodiments, the operating system query module

200 additionally or alternatively queries a device for a model or product identifier other than an SKU number such as an MID or product name. For example, the operating system query module 200 queries the OS of a mobile phone that is communicatively coupled with a pair of Bluetooth speakers to determine the product name of the Bluetooth speakers. As an additional example, the operating system query module 200 queries the OS of a mobile phone that is communicatively coupled with a vehicle's audio system to determine the MID of the vehicle's audio equipment.

The operating system query module 200 queries an OS of a device to identify the position or orientation of the device or audio rendering system (e.g., when separate from the device). For example, the operating system query module 200 queries the OS of a mobile phone to determine that the phone is oriented at 90 degrees in a landscape orientation (e.g., the device is laid along its length as opposed to its width) or a portrait orientation. In some embodiments, the device may further include sensors (e.g., cameras) that can be used to determine the location of the user relative to the position or orientation of the device.

The operating system query module 200 queries an OS of a device to determine a class to which the device belongs to (e.g., mobile phone, tablet, personal computer, automotive, etc.). For example, the operating system query module 200 queries the OS of a mobile phone to determine that the phone belongs to a mobile phone class. In another example, the operating system query module 200 queries the OS of a mobile phone that is communicatively coupled with a Bluetooth device to determine that the device belongs to a speaker device class (e.g., loudspeaker, as opposed to headphones, automotive, etc.). As an additional example, the operating system query module 200 queries the OS of a mobile phone that is communicatively coupled with a vehicle's audio rendering system to determine that the audio rendering system belongs to an automotive device class.

The operating system query module 200 queries an OS of a device to determine an audio codec used by the device. The audio codec may indicate the manufacturer of a device or otherwise identify the device. For example, the operating system query module 200 queries the OS of a mobile phone to determine that the manufacturer of the phone is a first manufacturer because the codecs supported include a particular proprietary audio codec such as the Qualcomm AptX codec. In another example, the operating system query module 200 queries the OS of a mobile phone that is communicatively coupled with a pair of Bluetooth speakers to determine that the speakers are manufactured by a second manufacturer because the codecs supported include a particular proprietary audio codec such as the Sony LDAC codec. As an additional example, the operating system query module 200 queries the OS of a mobile phone that is communicatively coupled with a vehicle's audio rendering system to determine that the audio rendering system is manufactured by a third manufacturer because codecs supported are two versions of a particular proprietary audio codec and AAC codecs.

The audio enhancement database 210 stores associations between audio rendering system information and audio enhancements. For example, the audio enhancement database 210 contains a mapping of a list of unique device identifiers to respective audio enhancements or optimizations. As referred to herein, an audio enhancement or optimization includes any modification that improves the functionality of the audio rendering system. For example, the audio enhancement database 210 contains mappings of an IMEI number of a mobile phone and/or a Bluetooth speaker address to respective pre-determined audio enhancements. As an additional example, the audio enhancement database 210 contains a mapping of a serial number-manufacturer pairing for a vehicle's audio rendering system to a pre-determined audio enhancement such as noise cancellation (e.g., for the constant humming noise generated by an engine). In this additional example, audio enhancer 220 may determine a device type or manufacturer name based on the unique device identifier of the audio rendering system, and use the device type or manufacturer name to retrieve the mapped audio enhancement using a serial number-manufacturer pairing from a database (e.g., the audio enhancement database 210).

Through its mappings, the audio enhancement system 150 may propagate user-specified audio enhancement preferences across multiple devices. For example, the audio enhancement system 150 may record enhancements specified by a user on a particular mobile phone and transfer over those audio enhancements after the user has changed cellular phone carriers or obtained a new phone. In another example, a user can customize audio enhancements for two different Bluetooth headphones of the same model, the audio enhancement system 150 enabling each headphone to retain its own customized mapping.

The audio enhancement database 210 contains a mapping of a list of communication paths to respective audio enhancements. An audio enhancement may include enhancement of spatial properties of an audio signal, such as subband spatial processing, crosstalk processing (e.g., crosstalk cancellation or crosstalk simulation), crosstalk compensation for artifacts caused by crosstalk processing, b-chain processing to adjust for asymmetry between left and right speakers. An audio enhancement may include other forms of enhancement of the audio signal, such as equalization, single and multi-band dynamics processing (i.e. compression, expansion, etc.), psychoacoustic bass enhancement, and other forms of linear and non-linear audio signal processing techniques. Subband spatial processing may include filtering side subband components and mid subband components of an audio signal. The properties of the filters for each mid and side subband component (e.g., applying gain, time delay, frequency response, etc.) may vary based on the audio rendering system information. Crosstalk cancellation may be used for audio rendering systems including loudspeakers to remove effects of crosstalk. Crosstalk simulation may be used for audio rendering systems including headphones to add crosstalk effects for simulating a loudspeaker listening experience. An audio enhancement that provides crosstalk processing may include different gain, time delay, and frequency response applied to left or right channels based on the audio rendering system information. Crosstalk compensation compensates for spectral defects caused by crosstalk processing, and thus the frequency response of a filter (e.g., applied to a left, right, mid, or side channel) vary based on differences in rendering system information and the crosstalk processing that is applied based on the rendering system information. B-chain processing adjusts for asymmetry between left and right speakers (e.g., in terms of frequency response, distance to listener, output direction, etc.) by applying at least one of a filter, time delay, or gain to one or more channels provided to speakers. The filter, time delay, or gain used in B-chain processing may vary based on different audio rendering system information. Other types of audio enhancement may include limiting or compression, audio holography, etc. Furthermore, combinations of multiple types of audio enhancement may be used based on the rendering system information. The types of audio enhancement used and the properties of the audio enhancement may vary based on audio rendering system information.

The audio enhancement database 210 contains mappings of audio communicated through built-in speakers on a mobile phone, through Bluetooth A2DP, and/or through a cable connection (e.g., USB cable) to respective pre-determined audio enhancements.

The audio enhancement database 210 contains a mapping of a list of device model or product identifiers (e.g., SKU numbers) to respective audio enhancements. For example, the audio enhancement database 210 contains a mapping a mobile phone manufacturer's manufacturing identifier for a mobile phone model to a pre-determined audio enhancement. In another example, the audio enhancement database 210 contains a mapping of a product name of a pair of Bluetooth speakers to a pre-determined audio enhancement. As an additional example, the audio enhancement database 210 contains a mapping of a MID of a vehicle's audio equipment to a pre-determined audio enhancement.

The audio enhancement database 210 contains a mapping of a list of device orientations or positions to respective audio enhancements. For example, the audio enhancement database 210 contains a mapping of a 0 degree orientation to a pre-determined audio enhancement.

The audio enhancement database 210 contains a mapping of a list of classes in which devices may be categorized to mapped audio enhancements. For example, the audio enhancement database 210 contains mappings of a mobile phone class, a mobile tablet class, a speaker class, a headphone class, a TV class, a laptop PC class, and/or automotive class to respective pre-determined audio enhancements.

The audio enhancement database 210 contains a mapping of a list of audio codec to respective audio enhancements. For example, the audio enhancement database 210 contains a mapping of the supported proprietary audio codec and SBC codecs to a first manufacturer. In another example, the audio enhancement database 210 contains a mapping of the supported AAC and SBC codecs to a second manufacturer. As an additional example, the audio enhancement database 210 contains a mapping of supported proprietary audio codecs and AAC codecs to a third manufacturer. In another example, an audio codec used by a device may be used to determine a particular device, device type, manufacturer or some other audio rendering system information, which is then used to query the audio enhancement database 210 to determine an audio enhancement.

The audio enhancer 220 adaptively applies device-specific audio enhancement based on the audio rendering system (e.g., built-in speakers or peripheral speakers) of each device. In some embodiments, the audio enhancer 220 receives rendering system information determined by the operating system query module 200 and determines an audio enhancement by querying the audio enhancement database 210. The audio enhancer 220 may be further configured to use audio rendering system information received from the OS to determine other types of audio rendering system information, and query the audio enhancement database 210 using the determined audio rendering system information. For example, the audio enhancer 220 receives a device class of "mobile phone" and an orientation of 90 degrees in "landscape" and determines an audio enhancement from mapped audio enhancements in the audio enhancement database 210. In some embodiments, the audio enhancer 220 receives the mapped audio enhancement settings determined from the operating system query module 200. For example, the audio enhancer 220 receives an audio enhancement configuration for a "mobile phone" class and a "landscape" orientation. In some embodiments, the applied audio enhancement combines multiple types of rendering system information to determine the audio enhancement. For example, the audio enhancement for a mobile phone with asymmetrically positioned loudspeakers oriented at 90 degrees is different from that of an audio enhancement for a mobile phone with symmetrically positioned loudspeakers oriented at 90 degrees. In some embodiments, the audio enhancer 220 receives an un-enhanced output signal from a device (e.g., a signal that the device would have output through its audio rendering system without audio enhancement) and applies the device-specific audio enhancement to the received signal. For example, the audio enhancer 220 receives an audio signal from the device 120 such that, instead of outputting the un-enhanced output signal, the device 130 outputs an enhanced audio signal transmitted by the audio enhancement system 151 on the device 120. The audio enhancer 220 includes submodules such as an enhancement configuration module 221 and a digital signal processor 222.

The enhancement configuration module 221 determines the device-specific audio enhancement based on rendering system information received from the operating system query module 200. In some embodiments, the enhancement configuration module 221 determines both a generic mapping and a customized mapping associated with the generic mapping. A generic mapping may be a generic device-class or SKU mapping, each of which may specify an additional, customized mapping based on other data (e.g., device orientation). The additional customizations may be stored within the audio enhancement database 210 as submappings associated with respective mappings (e.g., the generic mappings). Additionally, or alternatively, the additional customizations may be procedurally derived (e.g., based on an if-then analysis of the queried audio rendering system information). For example, the operating system query module 200 queries a mobile phone that is wirelessly coupled to a Bluetooth speaker to retrieve the SKU of the speaker. The audio enhancer 220 may then determine the appropriate mapping for the retrieved SKU information. The operating system query module 200 can further query the mobile phone for metadata attributes about currently active communication paths on the mobile phone for use-case information and the audio enhancer 220 may further determine customized mappings based on the retrieved use-case information.

In some embodiments, the enhancement configuration module 221 determines multiple mapped audio enhancements and determines a combined audio enhancement that accounts for the greater resolution of identifying information (as compared to the resolution available from only one mapped audio enhancement). For example, the enhancement configuration module 221 determines a first audio enhancement for a unique device identifier of a pair of Bluetooth speakers that corresponds to an audio enhancement for crosstalk cancellation specific to that model of speakers and determines a second audio enhancement appropriate to current use-case information (e.g. meta-data indicating that the audio signal is generated by a game). Responsive to determining the two types of audio enhancements, the enhancement configuration module 221 determines a combined audio enhancement that includes the first and second audio enhancements. The combined audio enhancement accounts for the resolution of identifying information that includes multiple rendering system information data points (e.g., both the speaker model and use-case information). The enhancement configuration module 211 may determine an order in which to apply multiple audio enhancements. In some embodiments, audio enhancements may be combined in parallel, in series, or a suitable combination thereof. For example, for a 2ch audio signal that is determined to be output via a 2ch sound system, the enhancement configuration module 221 may first apply processing to extract from the original 2ch audio signal a third channel, created from a band-passed version of the Mid (i.e. non-spatial) component of the stereo signal, and then apply cross-talk cancelation and psychoacoustic bass enhancement in series to the original stereo signal, while in parallel applying equalization and compression to the third channel (e.g. to enable improved dialog/speech intelligibility), and finally mix the enhanced third channel back in to the enhanced original stereo signal.

The digital signal processor 222 applies the audio enhancement determined by the enhancement configuration module 221 to the audio signal. Depending on the availability, resolution of the identifying information, and/or audio-rendering use-case, the digital signal processor 222 may apply a variety of different procedural approaches to audio optimization of an audio signal.

The enhanced signal communicator 230 receives the enhanced audio signal output by audio enhancer 220 and transmits it to the device(s) configured to output the audio signal. For example, the enhanced signal communicator 230 receives an enhanced signal from audio enhancer 220 that was enhanced based on a determination by the operating system query module 200 that the device is a mobile phone with a communication path including the built-in speakers. The enhanced signal communicator 230 may then transmit the enhanced signal to the mobile phone to output from the built-in speakers. In another example, the enhanced signal communicator 230 receives an enhanced signal from audio enhancer 220 that was enhanced based on a determination by the operating system query module 200 that the device is a mobile phone communicatively coupled to an audio rendering system of a Bluetooth speaker. The enhanced signal communicator 230 may then transmit the enhanced signal to the mobile phone to further transmit to the speaker. As an additional example, the enhanced signal communicator 230 receives an enhanced signal from audio enhancer 220 that was enhanced based on a determination by the operating system query module 200 that the device is a speaker in a moving vehicle, the speaker communicatively coupled to a mobile phone that is the source of the audio played back by the speaker. The enhanced signal communicator 230 may then transmit the enhanced signal to the mobile phone to further transmit to the speaker of the vehicle (e.g., through a wired USB connection). In some embodiments, such as when the audio enhancement system 151 is part of the device 120, the enhanced signal communicator 230 may be omitted.

In a client-server configuration of the audio enhancement system 150, various components of the audio enhancement system 150 may be located on the device. For example, the operating system query module 200 may be located on the device (e.g., included in audio enhancement system 151), and the device may provide the audio system rendering information to the audio enhancement system 150 on the server. The audio enhancement system 150 on the server may determine an audio enhancement based on the audio system rendering information and provide the audio enhancement to the device. The device may generate the enhanced audio signal using the audio enhancement. In this example, the audio enhancer 220 and the operating system query module 200 are located on the device.

Processes for Audio Enhancement System Operation

FIG. 3 is a flowchart of the process 300 for providing an enhanced audio signal. In some embodiments, the audio enhancement system 150 performs steps of the process 300 in parallel, in different orders, or performs different steps. For example, although not shown, the audio enhancement system 150 may receive, as an additional step in process 300, an audio signal to apply the audio enhancement to. In another example, the process 300 may repeat determining 310 an audio enhancement and include an additional step of combining the determined audio enhancements, where the combined enhancement will be applied 315 to the audio signal.

The audio enhancement system 150 determines 305 rendering system information of an audio rendering system associated with a device. In some embodiments, the operating system query module 200 queries an operating system of a device coupled to an audio rendering system for rendering system information. For example, the operating system query module 200 queries the OS of the device 120 to retrieve rendering system information such as the model name of the device, communication path of the audio signal, physical orientation or position of the phone, and/or class of the device (e.g. mobile phone, tablet, etc.). The queries may or may not be successful. For example, if the operating system query module 200 receives the device's orientation, model name, communication path, and device class, the audio enhancement system 150 may use some or all of this rendering system information to determine the most appropriate audio enhancement for the current state of the device 120. Alternatively, if the operating system query module 200 does not receive the device's orientation, the audio enhancement system 150 may determine an audio enhancement without accounting for device orientation and instead using information it has received such as model name, communication path, and device class.

The audio enhancement system 150 determines 310 an audio enhancement for an audio signal based on rendering system information. In some embodiments, audio enhancer 220 determines an appropriate audio enhancement for the available information determined in 305 by the operating system query module 200. For example, the enhancement configuration module 221 queries the audio enhancement database 210 to determine an audio enhancement appropriate for a combination of available rendering system information. In one example, rendering system information may include model name, a communication path including audio routed through the built-in speakers, a mobile phone device class, and a 90-degree orientation. This information may cause the enhancement configuration module 221 to determine an audio enhancement that involves utilizing two speakers on the phone located in different areas of the phone. For example, the determined orientation including speakers' locations relative to the each other that allows for the audio enhancement to determine a particular crosstalk cancellation setting to be applied to the audio signals in order to optimally simulate surround sound speakers. If the available rendering system information does not include device orientation, the remaining rendering system information components may cause the enhancement configuration module 221 to determine an audio enhancement based on a standard ore most likely speaker orientation.

In some embodiments, the audio enhancement system 150 may rely on a hierarchy of rendering system information, where the audio enhancement system 150 first queries the OS for higher priority rendering system information. If the OS returns valid rendering system information to the audio enhancement system 150 and an associated audio enhancement exists for the rendering system information, then the audio enhancement is selected for use. If the OS does not provide valid rendering system information or there is no associated audio enhancement for the received rendering system information, then the audio enhancement system 150 may continue attempting to query the OS for lower priority rendering system information, and so forth. For example, a unique device identifier may be a higher priority type of rendering system information than a device class because a particular audio rendering system can be determined if the device is known while devices of the same class may include similar but different audio rendering systems.

The audio enhancement system 150 applies 315 the audio enhancement to the audio signal to generate an enhanced audio signal. In some embodiments, the digital signal processor 222 transforms an audio signal using the determined 310 audio enhancement. For example, the digital signal processor 222 may divide an audio signal bandwidth into subbands and independently adjust spatial and/or non-spatial component energy in each frequency subband.

The audio enhancement system 150 provides 320 the enhanced audio signal to the audio rendering system. In some embodiments, the enhanced signal communicator 230 transmits the enhanced audio signal generated by the digital signal processor 222 to the audio rendering system configured to output the enhanced audio signal. Each of the enhanced signal communicator 230, the digital signal processor 222, and audio rendering system may be located on a device. In another example, the enhanced signal communicator 230 and the digital signal processor 222 are on a device, and the audio rendering system is a peripheral device connected to the device. In another example, the enhanced signal communicator 230 transmits, over the network 110, the enhanced audio signal to device 110 to output through the audio rendering system associated with the device 110.

Figure 4:
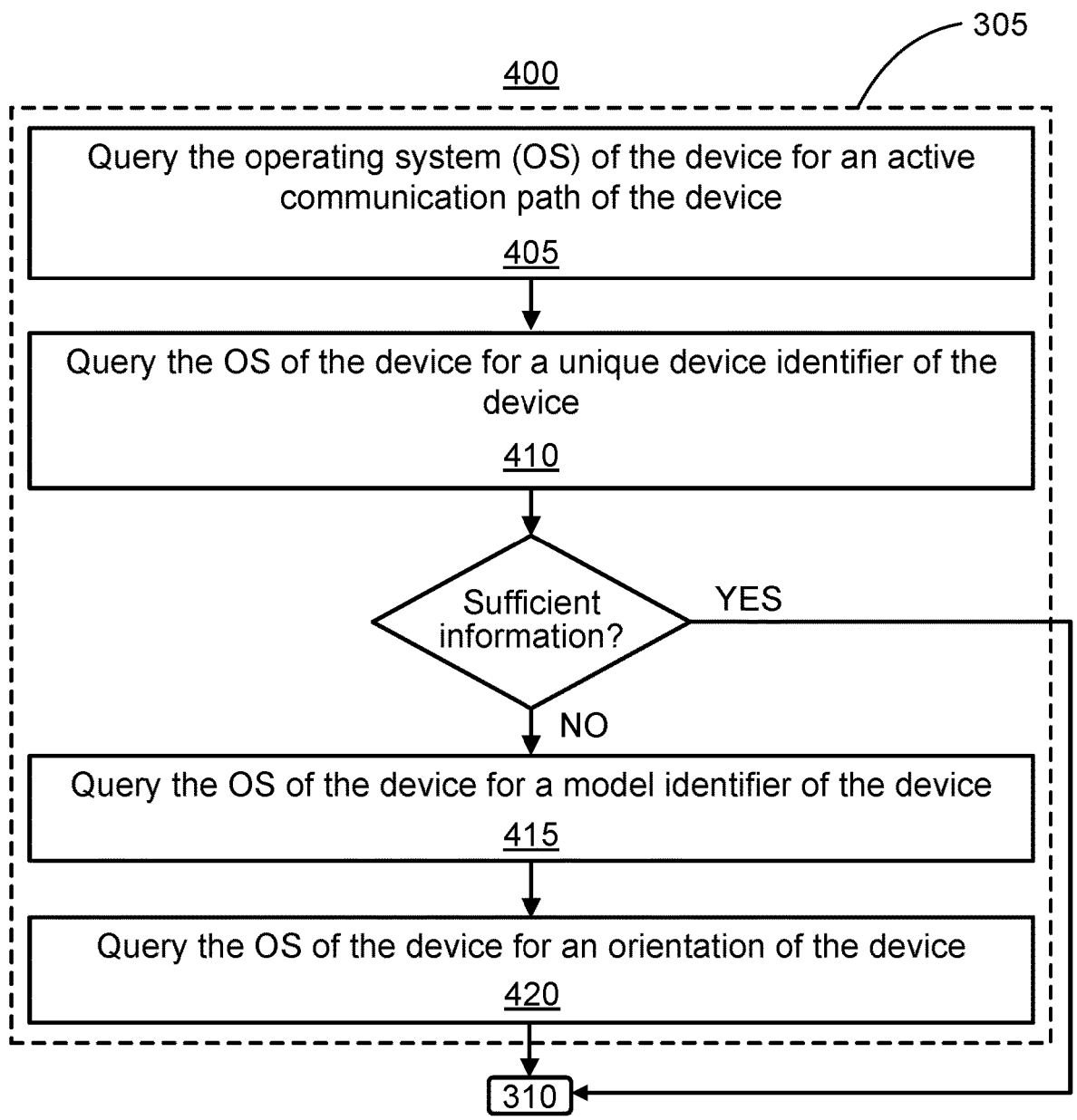
FIG. 4 is a flowchart of a process for determining rendering system information when providing an enhanced audio signal through a device's built-in audio rendering system, in accordance with at least one embodiment.

FIG. 4 is a flowchart of a process 400 for determining rendering system information when providing an enhanced audio signal through a mobile device's built-in audio rendering system. In some embodiments, the audio enhancement system 150 performs steps of the process 400 in parallel, in different orders, or performs different steps. For example, determining if there is sufficient information to proceed to determining an audio enhancement may be done after each query to an OS of a device. In some embodiments, the queries to the OS of the device do not have to be in the order shown in the process 400. For example, the audio enhancement system 150 may query 415 the model identifier of a device before querying 405 the active communication path of the device.

The audio enhancement system 150 queries 405 the OS of a device for an active communication path of the device. For example, the audio enhancement system 150 queries the OS of device 110, a mobile phone, for the phone's currently active communication path. The operating system query module 200 uses Android OS's AudioDeviceInfo class API to determine the active communication path. Subsequent to determining the communication path, query module 200 may compare the path with a list of paths in an internal database (e.g., the audio enhancement database 210) or an online database for communication path-to-optimization or enhancement mappings. A path-to-optimization mapping may include instructions to apply a signal enhancement specific to communication paths on devices with a particular OS. If such a mapping is found in a database, the audio enhancement system 150 may directly use the mapped audio enhancement (e.g., proceeding to determining 310) or continue to query for additional information to determine an audio enhancement that accounts for a greater amount of rendering system information (e.g., proceeding to querying 410).

The audio enhancement system 150 queries 410 the OS of the device for a unique device identifier of the device. For example, the audio enhancement system 150 queries the OS of device 110 for its unique device identifier. The operating system query module 200 may query for a serial number of the mobile phone and compare the retrieved serial number against an internal database (e.g., the audio enhancement database 210) or an online database of unique-device-identifier-to-optimization or enhancement mappings. In some embodiments, previous queries may be taken into account for subsequent retrievals from databases. For example, the audio enhancement database 210 may include an audio enhancement mapping for the combination of the serial number and the active communication path of the mobile phone.

The audio enhancement system 150 determines if there is sufficient information to proceed to determining 310 an audio enhancement for an audio signal based on rendering system information queried 405 and 410. In some embodiments, the audio enhancement system 150 avoids unnecessary processing delays or resource consumption by introducing information sufficiency checks between queries to a device's OS. For example, the enhancement configuration module 221 determines if there is enough rendering system information available to determine an audio enhancement, providing an enhanced audio signal with less delay and less power consumed. In this way, a user can listen to the enhanced audio signal without as much delay and, if the audio enhancement system 150 resides on a battery-powered device, maximizing device lifespan before the next recharge. If a serial number was not retrievable during query 410, the process 400 may proceed to query 415 the OS of the device for the device's model identifier. Otherwise, the audio enhancement system 150 determines that the serial number and audio path queried is enough to proceed to determining 310 an audio enhancement.

The audio enhancement system 150 queries 415 the OS of the device for a model identifier of the device. For example, the audio enhancement system 150 queries the OS of device 110 for its model identifier. The operating system query module 200 may query for a model identifier of the mobile phone and compare the retrieved model identifier against an internal database (e.g., the audio enhancement database 210) or an online database of model-identifier-to-optimization or enhancement mappings. In some embodiments, previous queries may be taken into account for subsequent retrievals from databases. For example, the audio enhancement database 210 may include an audio enhancement mapping for the combination of the model identifier and the active communication path of the mobile phone.

The audio enhancement system 150 queries 420 the OS of the device for an orientation of the device. For example, the audio enhancement system 150 queries the OS of device 110 for its orientation. The operating system query module 200 may query for an orientation of the mobile phone and compare the retrieved orientation against an internal database (e.g., the audio enhancement database 210) or an online database of orientation-to-optimization or enhancement mappings. In some embodiments, previous queries may be taken into account for subsequent retrievals from databases. For example, the audio enhancement database 210 may include an audio enhancement mapping for the combination of the orientation, the model identifier, and the active communication path of the mobile phone. The process 400 may proceed to determining 310 an audio enhancement using the audio enhancement mapping for that combination.

Figure 5:
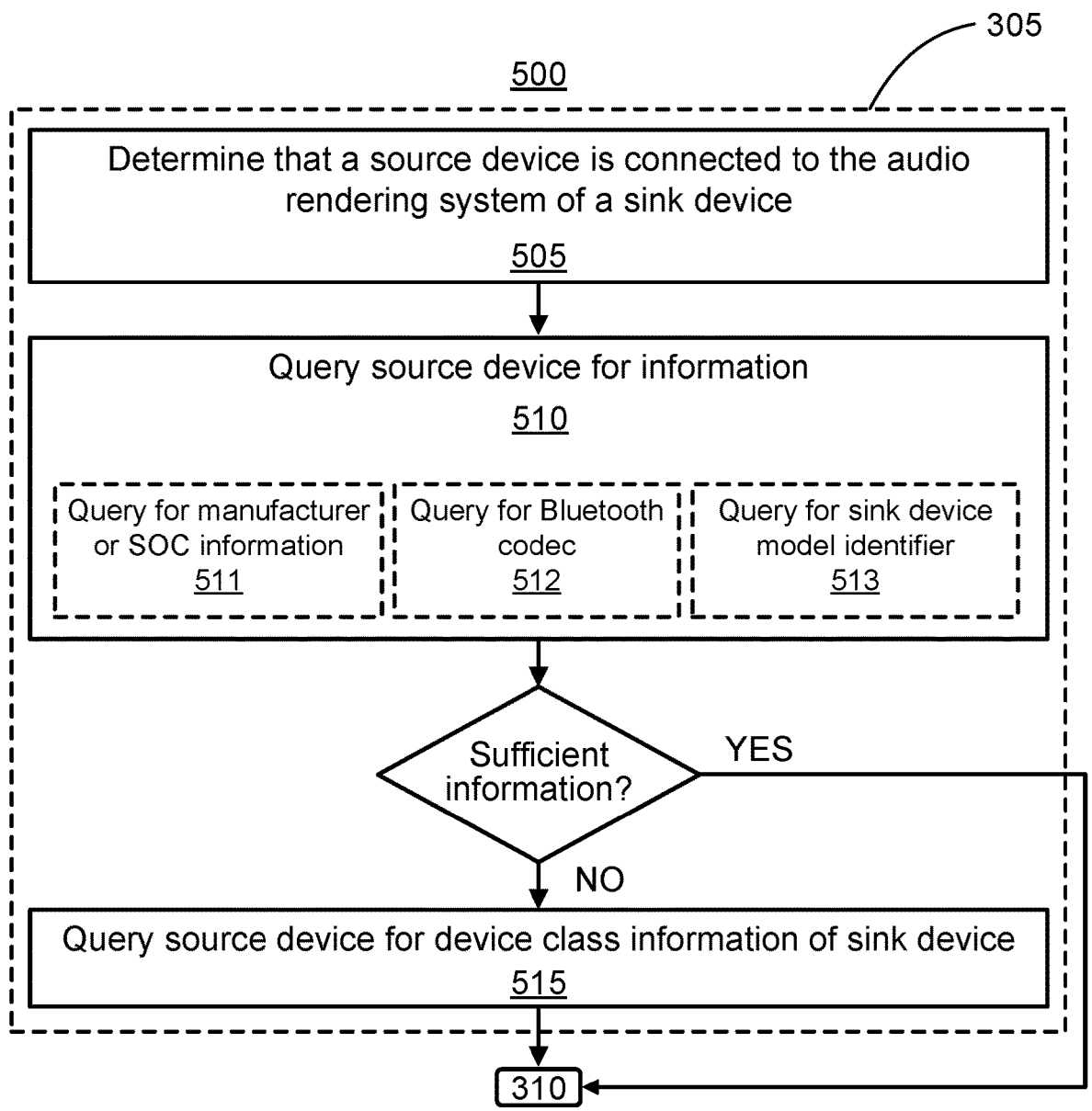
FIG. 5 is a flowchart of a process for determining rendering system information when providing an enhanced audio signal through an audio rendering system that is communicatively coupled to a device through a wireless connection, in accordance with at least one embodiment.

FIG. 5 is a flowchart of a process 500 for determining rendering system information when providing an enhanced audio signal through an audio rendering system that is communicatively coupled to a device through a wireless connection. In some embodiments, the audio enhancement system 150 performs steps of the process 500 in parallel, in different orders, or performs different steps.

The audio enhancement system 150 determines 505 that a source device is connected to the audio rendering system of a sink device. A device may be a "source" device that is coupled to an audio rendering system of a "sink" device. For example, a source device, a mobile phone, is used to output audio through a sink device, a Bluetooth speaker, over Bluetooth A2DP. The audio enhancement system 150 may use an OS API to determine that a source device (e.g., the device 120) is connected and communicating audio signals to an external sink device (e.g., the device 130) over Bluetooth A2DP.

The audio enhancement system 150 queries 510 the OS of the source device for information. Query 510 may include query 511 to the OS of the source device for the manufacturer, SoC SKU or model name of the sink device. For example, the operating system query module 200 uses tools such as BlueZ hcitool to query the OS of the device 120 for the manufacturer of device 130. Although not shown, the audio enhancement system 150 may perform a check after query 511 to determine if the rendering system information is sufficient to determine an audio enhancement. For example, depending on the manufacturer of Bluetooth speaker 130, the audio enhancement system 150 may enhance Bluetooth sink devices using SoCs provided by a particular manufacturer. Query 510 may alternatively or additionally include query 512 to the OS of the source device for the Bluetooth codec supported by the sink device. For example, manufacturer-codec query module queries the OS of the device 120 to determine the codec(s) supported. Depending on the codec supported, the process 500 may, although not shown in FIG. 5, proceed directly to determining 310 an audio enhancement. For example, the enhancement configuration module 221 may determine to apply an enhancement when a particular codec is supported. Query 510 may alternatively or additionally include query 513 to the OS of the source device for the sink device model identifier. For example, the operating system query module 200 queries the OS of the device 120 to determine the model identifier of the device 130. If a model identifier for the sink device is found in the audio enhancement database 210, the audio enhancement system 150 may proceed to configure an audio enhancement as defined (e.g., determination 310).

The audio enhancement system 150 determines if there is sufficient information to proceed to determining 310 an audio enhancement for an audio signal based on rendering system information queried 510. For example, if a Bluetooth codec was not retrievable during query 510, the process 500 may proceed to query 515 the OS of the source device for the sink device's class information. Otherwise, the audio enhancement system 150 determines that the manufacturer name, codec, and/or sink device model identifier queried is enough to proceed to determining 310 an audio enhancement.

The audio enhancement system 150 queries 515 the OS of the source device for device class information of the sink device. In some embodiments, the operating system query module 200 queries the OS of the device 120 for the device information of device 130. For example, the operating system query module 200 may determine the rendering system information that indicates device 130 is in a speaker class. If device class information is found in the audio enhancement database 210, the audio enhancement system 150 may configure the audio enhancement as defined (e.g., determination 310).

Figure 6:
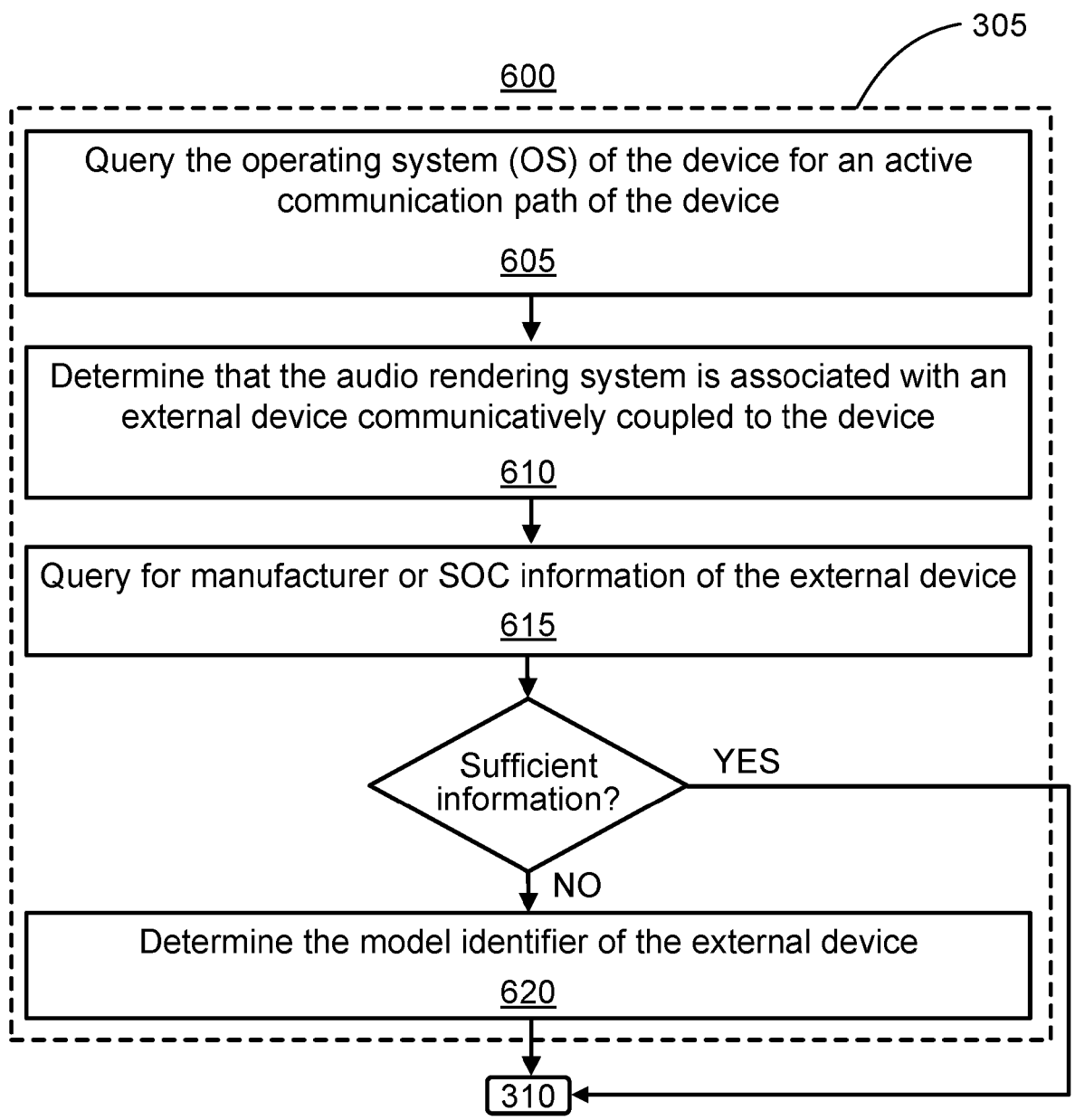
FIG. 6 is a flowchart of a process for determining rendering system information when providing an enhanced audio signal through a device that is communicatively coupled to an audio rendering system through a wired connection, in accordance with at least one embodiment.

FIG. 6 is a flowchart of a process 600 for determining rendering system information when providing an enhanced audio signal through a device that is communicatively coupled to an audio rendering system through a wired connection. The device 140 may be a smart TV platform that is communicatively coupled to an audio rendering system through an HDMI connection. For example, the device 140 can be a smart TV platform that is coupled to a TV monitor with built-in speakers or to a sound bar. In another example of devices coupled via a wired connection, the device 120 is a mobile phone that is communicatively coupled to headphones through a USB-C connection or any other digital connection (e.g., using a lightning connector). In some embodiments, the audio enhancement system 150 performs steps of the process 600 in parallel, in different orders, or performs different steps.

The audio enhancement system 150 queries 605 the OS of a device for an active communication path of the device. For example, the operating system query module 200 queries the OS of the device 140 using an API (e.g., querying a smart TV platform using Android OS's AudioDeviceInfo class API) to determine an active communication path of the device 140. In some embodiments, the active communication path may be through an HDMI connection. The audio enhancement system 150 may find a mapping, in the audio enhancement database 210, of an HDMI route to a corresponding audio enhancement. For example, the audio enhancement database 210 contains a mapping with instructions on an audio enhancement for HDMI audio communication paths associated with a particular TV model or manufacturer. Although not depicted in the process 600, if communication path information is found in the audio enhancement database 210, the audio enhancement system 150 may proceed directly to determine 310 an audio enhancement based on the active communication path without proceeding to determine 610 that there is an external device coupled to the device.

The audio enhancement system 150 determines 610 that the audio rendering system is associated with an external device communicatively coupled to the device. In some embodiments, based on the result of query 605, the audio enhancement system 150 determines that the audio rendering system associated with an external device is outputting the audio transmitted to the external device from the device. For example, if query 605 indicates that the audio is being routed through an HDMI connection, the audio enhancement system 150 may determine that the device 140 is communicatively coupled with an external device (e.g., a TV monitor with built-in speakers) that is outputting audio through its audio rendering system.

The audio enhancement system 150 queries 615 the device for the manufacturer or SoC information of the external device. For example, the operating system query module 200 may use Android OS's AudioDeviceClass on a smart TV platform to determine a manufacturer ID from the EDID information of the external device. If the audio enhancement system 150 has sufficient information about the external device, it proceeds to determining 310 an audio enhancement for an audio signal. Otherwise, the audio enhancement system 150 determines 620 more information about the external device such as the external device's model identifier.

The audio enhancement system 150 determines 620 the model identifier of the external device. In some embodiments, the operating system query module 200 queries a device that is determined to be associated with an external device for the model identifier of the external device. For example, the operating system query module 200 queries the OS of the device 140, a smart TV platform, for the model identifier of the TV monitor that is connected to the smart TV platform through an HDMI cable. The operating system query module 200 may determine, using the EDID information available over the HDMI connection, the model identifier of the TV monitor and information about its audio rendering system. The process 600 may proceed to determining 310 an audio enhancement based on the rendering system information (e.g., the model identifier of the external device).

Example Computer

Figure 7:
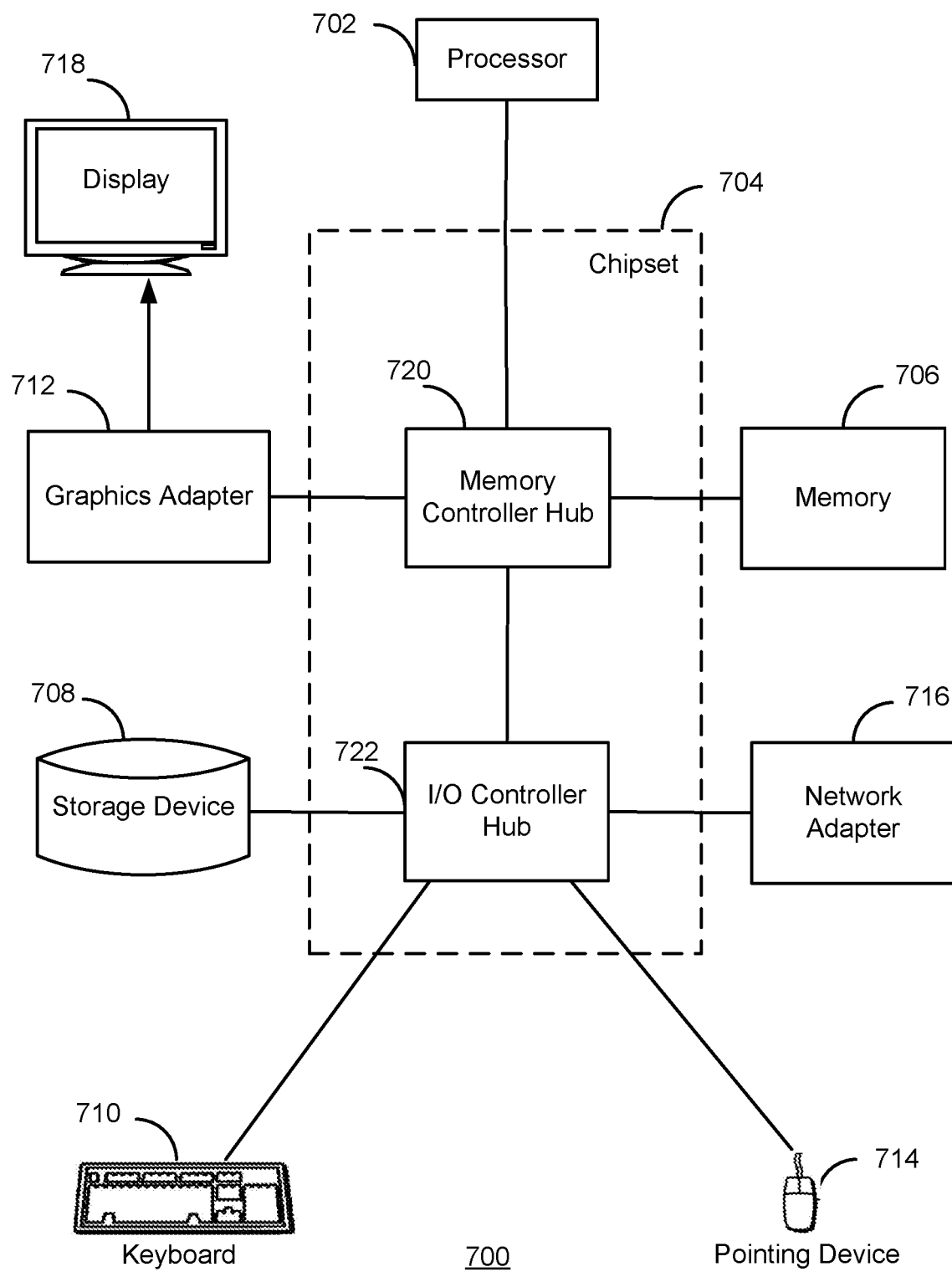
FIG. 7 is a block diagram of a computer, in accordance with at least one embodiment.

FIG. 7 is a block diagram of a computer 700, in accordance with some embodiments. The computer 700 is an example of circuitry that implements an audio processing system, such as audio processing system 150. Illustrated are at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display device 718 is coupled to the graphics adapter 712. A storage device 708, keyboard 710, pointing device 714, and network adapter 716 are coupled to the I/O controller hub 722. The computer 700 may include various types of input or output devices. Other embodiments of the computer 700 have different architectures. For example, the memory 706 is directly coupled to the processor 702 in some embodiments.

The storage device 708 includes one or more non-transitory computer-readable storage media such as a hard drive, compact disk read-only memory (CD-ROM), DVD, or a solid-state memory device. The memory 706 holds program code (comprised of one or more instructions) and data used by the processor 702. The program code may correspond to the processing aspects described with reference to FIGS. 1 through 5.

The pointing device 714 is used in combination with the keyboard 710 to input data into the computer system 700. The graphics adapter 712 displays images and other information on the display device 718. In some embodiments, the display device 718 includes a touch screen capability for receiving user input and selections. The network adapter 716 couples the computer system 700 to a network. Some embodiments of the computer 700 have different and/or other components than those shown in FIG. 7.

In some embodiments, the circuitry that implements an audio processing system, such as the audio processing system 100 or 200, may include an application-specific integrated circuit (ASIC), a field-programmable gate array (FPGA), or other types of computing circuitry.

Additional Considerations

Example benefits and advantages of the disclosed configurations include dynamic audio enhancement due to the enhanced audio system adapting to a device and associated audio rendering system as well as other relevant information made available by the device OS, such as use-case information (e.g., indicating that the audio signal is used for music playback rather than for gaming). The enhanced audio system may either be integrated into a device (e.g., using a software development kit) or stored on a remote server to be accessible on-demand. In this way, a device need not devote storage or processing resources to maintenance of an audio enhancement system that is specific to its audio rendering system or audio rendering configuration. In some embodiments, the enhanced audio system enables varying levels of querying for rendering system information such that effective audio enhancement can be applied across varying levels of available device-specific rendering information.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Upon reading this disclosure, those of skill in the art will appreciate still additional alternative structural and functional designs for a system and a process for audio enhancement using device-specific metadata through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method for enhancing an audio signal for rendering by an audio rendering system associated with a device, comprising:
   transmitting a request to an operating system of the device for rendering system information of the audio rendering system associated with the device, the operating system operating the device and the audio rendering system;
   receiving, from the operating system of the device, the rendering system information, wherein the rendering system information comprises data representative of a communication path of the audio signal, wherein the communication path of the audio signal is a headphone jack, built-in speakers of the device, a wireless connection, a universal serial bus (USB) connection, or a high-definition multi-media interface (HDMI);
   querying a database using the data representative of the communication path of the audio signal;
   receiving, responsive to querying the database, an audio enhancement, wherein the audio enhancement is mapped, in the database, to the data representative of the communication path of the audio signal;
   applying the audio enhancement to the audio signal to generate an enhanced audio signal; and providing the enhanced audio signal to the audio rendering system.

2. The method of claim 1, wherein the database is in one of the device or a remote system connected to the device via a network.

3. The method of claim 1, wherein the rendering system information further includes data indicative of a device class or manufacturer information.

4. The method of claim 1, wherein the communication path of the audio signal includes metadata indicative of an audio consumption software application associated with the audio signal.

5. The method of claim 1, wherein the rendering system information further comprises data representative of at least one of a position or orientation of the device.

6. The method of claim 1, wherein the rendering system information further comprises data representative of an audio codec used by the device.

7. The method of claim 1, wherein the audio enhancement includes filtering side subband components and mid subband components of the audio signal.

8. The method of claim 1, wherein the audio enhancement includes crosstalk processing.

9. The method of claim 1, wherein the audio enhancement includes adjusting for an asymmetry between a left and right speaker of the audio rendering system by applying at least one of a filter, time delay, or gain.

10. A method for enhancing an audio signal for rendering by an audio rendering system associated with a device, comprising:
    receiving rendering system information comprising data representative of an audio signal communication path associated with the device, wherein the data representative of the audio signal communication path is indicative of the audio rendering system being integrated with the device, a wired connection with the audio rendering system, or a wireless connection with the audio rendering system;
    querying a database using the data representative of the audio signal communication path;
    responsive to the database query, determining an audio enhancement mapped to the data representative of the audio signal communication path;
    applying the determined audio enhancement to the audio signal to generate an enhanced audio signal; and
    providing the enhanced audio signal to the device.

11. The method of claim 10, wherein the database is in a remote system connected to the device via a network.

12. The method of claim 10, wherein the data representative of the audio signal communication path includes metadata indicative of a headphone jack, built-in speakers of the device, a wireless connection, a universal serial bus (USB) connection, or a high-definition multi-media interface (HDMI).

13. The method of claim 10, wherein the data representative of the audio signal communication path includes metadata indicative of an audio consumption software application associated with the audio signal.

14. The method of claim 10, wherein the rendering system information further comprises data representative of at least one of a position or orientation of the device.

15. The method of claim 10, wherein the rendering system information further comprises data representative of an audio codec used by the device.

16. The method of claim 10, wherein the audio enhancement includes filtering side subband components and mid subband components of the audio signal.

17. The method of claim 10, wherein the audio enhancement includes crosstalk processing.

18. The method of claim 10, wherein the audio enhancement includes adjusting for an asymmetry between a left and right speaker of the audio rendering system by applying at least one of a filter, time delay, or gain.

19. A non-transitory computer readable medium storing instructions that when executed by one or more processors configure the one or more processors to:
    receive rendering system information comprising data representative of a type of communication path of an audio signal to be rendered by an audio rendering system associated with a device, corresponding to an analog or digital, internal or external, wired or wireless path between the audio rendering system and the device;
    query a database using the data representative of the type of communication path;
    responsive to the queried database, determine an audio enhancement mapped to the data representative of the type of communication path;
    apply the determined audio enhancement to the audio signal to generate an enhanced audio signal; and
    provide the enhanced audio signal to the device.

20. The non-transitory computer readable medium of claim 19, wherein the data representative of the audio signal communication path includes metadata indicative of a headphone jack, built-in speakers of the device, a wireless connection, a universal serial bus (USB) connection, or a high-definition multi-media interface (HDMI).

21. The non-transitory computer readable medium of claim 19, wherein the database is in a remote system connected to the device via a network.

22. The non-transitory computer readable medium of claim 19, wherein the data representative of the audio signal communication path includes metadata indicative of an audio consumption software application associated with the audio signal.

23. The non-transitory computer readable medium of claim 19, wherein the rendering system information further comprises data representative of at least one of a position or orientation of the device.

24. The non-transitory computer readable medium of claim 19, wherein the rendering system information further comprises data representative of an audio codec used by the device.

25. The non-transitory computer readable medium of claim 19, wherein the audio enhancement includes filtering side subband components and mid subband components of the audio signal.

26. The non-transitory computer readable medium of claim 19, wherein the audio enhancement includes crosstalk processing.

27. The non-transitory computer readable medium of claim 19, wherein the audio enhancement includes adjusting for an asymmetry between a left and right speaker of the audio rendering system by applying at least one of a filter, time delay, or gain.

28. A non-transitory computer readable medium storing instructions that when executed by one or more processors configure the one or more processors to:
    receive rendering system information comprising data representative of a communication path of an audio signal to be rendered by an audio rendering system associated with a device, wherein the communication path of the audio signal is a headphone jack, built-in speakers of the device, a wireless connection, a universal serial bus (USB) connection, or a high-definition multi-media interface (HDMI);

query a database using the data representative of the communication path of the audio signal;

receive, responsive to querying the database, an audio enhancement, wherein the audio enhancement is mapped, in the database, to the data representative of the communication path of the audio signal;

apply the audio enhancement to the audio signal to generate an enhanced audio signal; and provide the enhanced audio signal to the audio rendering system.

29. The non-transitory computer readable medium of claim 28, wherein the database is in one of the device or a remote system connected to the device via a network.

30. The non-transitory computer readable medium of claim 28, wherein the rendering system information further includes data indicative of a device class or manufacturer information.

31. The non-transitory computer readable medium of claim 28, wherein the communication path of the audio signal includes metadata indicative of an audio consumption software application associated with the audio signal.

32. The non-transitory computer readable medium of claim 28, wherein the rendering system information further comprises data representative of at least one of a position or orientation of the device.

33. The non-transitory computer readable medium of claim 28, wherein the rendering system information further comprises data representative of an audio codec used by the device.

34. The non-transitory computer readable medium of claim 28, wherein the audio enhancement includes filtering side subband components and mid subband components of the audio signal.

35. The non-transitory computer readable medium of claim 28, wherein the audio enhancement includes crosstalk processing.

36. The non-transitory computer readable medium of claim 28, wherein the audio enhancement includes adjusting for an asymmetry between a left and right speaker of the audio rendering system by applying at least one of a filter, time delay, or gain.

* * * * *